US008250544B2

(12) United States Patent
McKinsey et al.

(10) Patent No.: US 8,250,544 B2
(45) Date of Patent: Aug. 21, 2012

(54) ANNOTATING EXCEPTION INFORMATION IN A COMPUTER PROGRAM

(75) Inventors: Christopher M. McKinsey, Sammamish, WA (US); Marko Krsta Radmilac, Bellevue, WA (US); Charles L. Mitchell, Kirkland, WA (US); Andrew E. Ayers, Kirkland, WA (US); Louis Lafreniere, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 974 days.

(21) Appl. No.: 12/043,007

(22) Filed: Mar. 5, 2008

(65) Prior Publication Data

US 2009/0228869 A1 Sep. 10, 2009

(51) Int. Cl.
*G06F 9/44* (2006.01)
(52) U.S. Cl. ........................................................ 717/131
(58) Field of Classification Search .................. 717/128, 717/130, 131
See application file for complete search history.

(56) References Cited

U.S. PATENT DOCUMENTS

| | | | | |
|---|---|---|---|---|
| 5,502,827 | A * | 3/1996 | Yoshida | 712/244 |
| 5,778,219 | A * | 7/1998 | Amerson et al. | 712/244 |
| 6,363,522 | B1 | 3/2002 | Click, Jr. et al. | |
| 6,934,832 | B1 * | 8/2005 | Van Dyke et al. | 712/244 |
| 7,058,935 | B2 | 6/2006 | Kawahito et al. | |
| 7,120,904 | B1 | 10/2006 | Robison | |
| 7,240,343 | B2 | 7/2007 | Ogasawara | |
| 7,308,680 | B2 | 12/2007 | Grover et al. | |
| 2002/0169999 | A1 | 11/2002 | Bhansali et al. | |
| 2006/0112373 | A1 | 5/2006 | Rokosz | |
| 2007/0006192 | A1 * | 1/2007 | Grover et al. | 717/146 |
| 2007/0022321 | A1 | 1/2007 | Chua et al. | |

OTHER PUBLICATIONS

Schaefer, Carl F. et al., "Static Analysis of Exception Handling in Ada" (18 pages), Oct. 1993 http://citeseer.ist.psu.edu/cache/papers/cs/27834/http:zSzzSzwww.cs.ubc.cazSzlocalzSzreadingzSzproceedingszSzspe91-95zSzspezSz.zSzvol23zSzissue10zSzspe858.pdf/schaefer93static.pdf.
Benton, Nick et al., Semantics of an Effect Analysis for Exceptions, Jan. 16, 2007, (11 pages) http://delivery.acm.org/10.1145/1200000/1190320/p15-benton.pdf?key1=1190320&key2=0496372021&coll=GUIDE&dl=GUIDE&CFID=15937068&CFTOKEN=37514225.
Fu, Chen et al., Exception-Chain Analysis: Revealing Exception Handling Architecture in Java Server Applications (10 pages), 29th International Conference of Software Engineering, 2007.
"Exception Handling in NetUI", The Apache Software Foundation (5 pages), Dec. 14, 2006 http://beehive.apache.org/docs/1.0.2/netui/exceptionHandling.html.

* cited by examiner

*Primary Examiner* — Anna Deng
(74) *Attorney, Agent, or Firm* — Workman Nydegger

(57) ABSTRACT

Annotation of exception information in a computer program. This annotation is not present in the source code itself, but is annotated during the compilation process or perhaps for purpose of analyzing the code. To perform the annotation, environmental rules are accessed regarding the environment in which the program is to be executed. The program is then evaluated in the context of these environmental rules to detect portions that, in the context of the environmental rules, may cause exceptions to be thrown. Those portions may then be annotated with exception information that describes any exceptions that could be thrown at that detected portion.

15 Claims, 3 Drawing Sheets

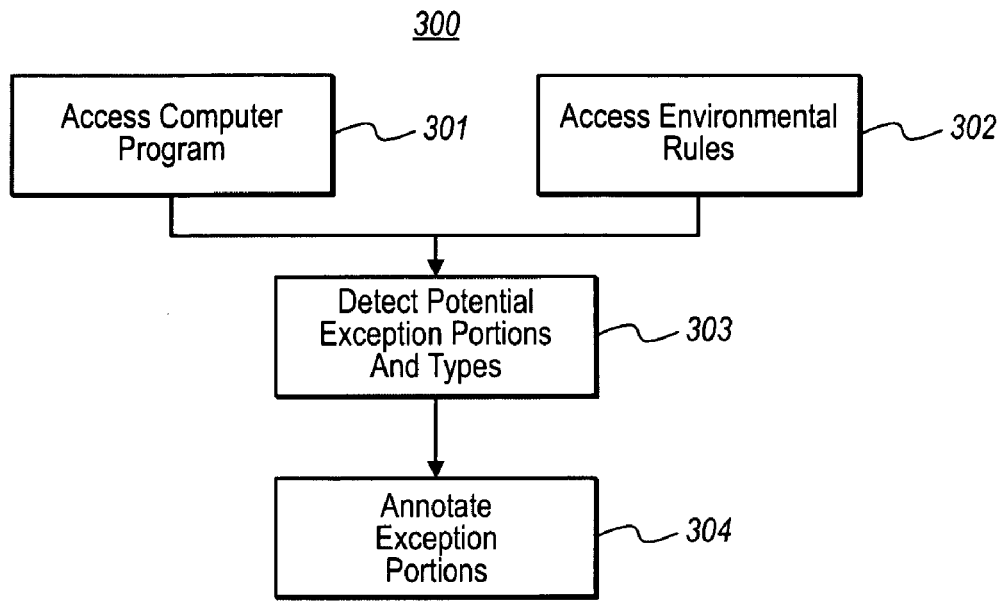
FIG. 3
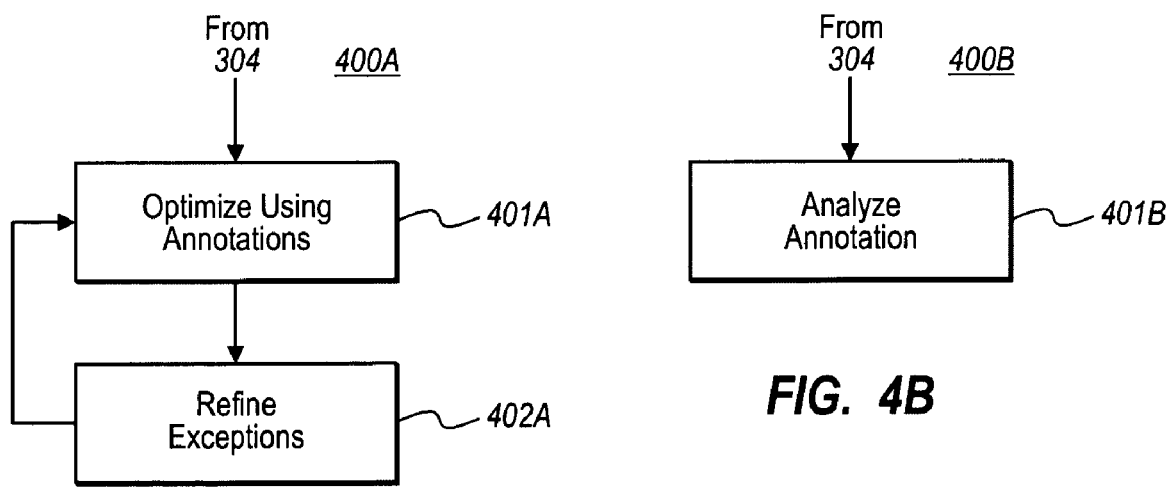
FIG. 4A
FIG. 4B

ANNOTATING EXCEPTION INFORMATION IN A COMPUTER PROGRAM

BACKGROUND

When software is authored, it is often authored in a language that is more intuitive to a human software developer. Software code authored in this language is often termed "source code". Source code cannot, however, be run directly by processors. Instead, the source code is compiled or interpreted into a machine-readable form often termed "machine code" or "binary".

Compilers are now very sophisticated, and are even able to optimize the code prior to creating the machine code. Compilers generate the machine code using the source code as an input. However, the compilers also use information about the environment in transforming the source code into functionally equivalent machine code. During compilation, optimizations of the instruction flow may also be performed. For example, one instruction might be moved from one location to another if the functionality is not altered.

In performing these optimizations, conventional compilers take exception handling into account. As a program is executing, there may be times when the program encounters a state that the program itself is not able to handle. For example, the program might not be able to encounter a divide by zero operation, or perhaps an access violation, or a stack overflow condition. In those situations, the program will often "throw an exception". The operating system then traps the exception, and finds the appropriate exception handler for that type of exception. The operating system then transfers control of execution back to the handler that accepted the exception.

Performing optimization of code that may throw an exception at runtime is problematic. After all, when an exception is thrown, code that is not within the program is run. Optimization of the program in the context of code that might run outside of the program is difficult because the program behavior becomes difficult to predict. Moving a line of code from one position to another may have unintended consequences when considering the possible execution of exception handling code outside of the program.

BRIEF SUMMARY

At least some embodiments described herein relate to the annotation of exception information within a computer program. This annotation is not present in the source code itself, but is annotated during the compilation process perhaps in an intermediate form of the code. The annotation might also be included in intermediate code in order to better analyze code.

In order to perform the annotation, the computer program is accessed, along with environmental rules regarding the environment in which the computer program is to be executed. The computer program is then evaluated in the context of these environmental rules to detect portions that, in the context of the environmental rules, may cause exceptions to be thrown. Those portions may then be annotated with exception information that describes any exceptions that could be thrown at that detected portion.

The annotations may be used to analyze the computer program, or may be used to optimize the computer program. If used to optimize, the annotations might include further optimization constraints that the compiler will follow during optimization. If the annotation is comprehensive, the compiler might not even need to query information outside of the computer program in order to perform optimization. All of the information needed to optimize might even be included within the annotation itself.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 3 illustrates a flowchart of a method for annotating a computer program with exception handling information;

FIG. 4A illustrates a flowchart of a method for optimizing based on the annotated exception handling information; and FIG. 4B illustrates a flowchart of a method for analyzing the annotated exception handling annotations.

DETAILED DESCRIPTION

In accordance with embodiments described herein, exception information is annotated within a computer program. This annotation is not present in the source code itself, but is annotated during the compilation process perhaps in an intermediate form of the code. The annotation might also be included in intermediate code in order to better analyze code.

In order to perform the annotation, the computer program is accessed, along with environmental rules regarding the environment in which the computer program is to be executed. The computer program is then evaluated in the context of these environmental rules to detect portions that, in the context of the environmental rules, may cause exceptions to be thrown. Those portions may then be annotated with exception information that describes any exceptions that could be thrown at that detected portion.

The annotations may be used to analyze the computer program, or may be used to optimize the computer program. If used to optimize, the annotations might include further optimization constraints that the compiler will follow during optimization. If the annotation is comprehensive, the compiler might not even need to query information outside of the computer program in order to perform optimization. All of the information needed to optimize might even be included within the annotation itself. During optimization, the exception information may be further refined.

First, some introductory discussion regarding a computing system will be described with respect to FIG. 1. Then, various embodiments of the annotation mechanism will be described with respect to FIGS. 2 through 4B.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems. That said, a "message processor" is not even limited to use in a computing system at all.

Figure 1:
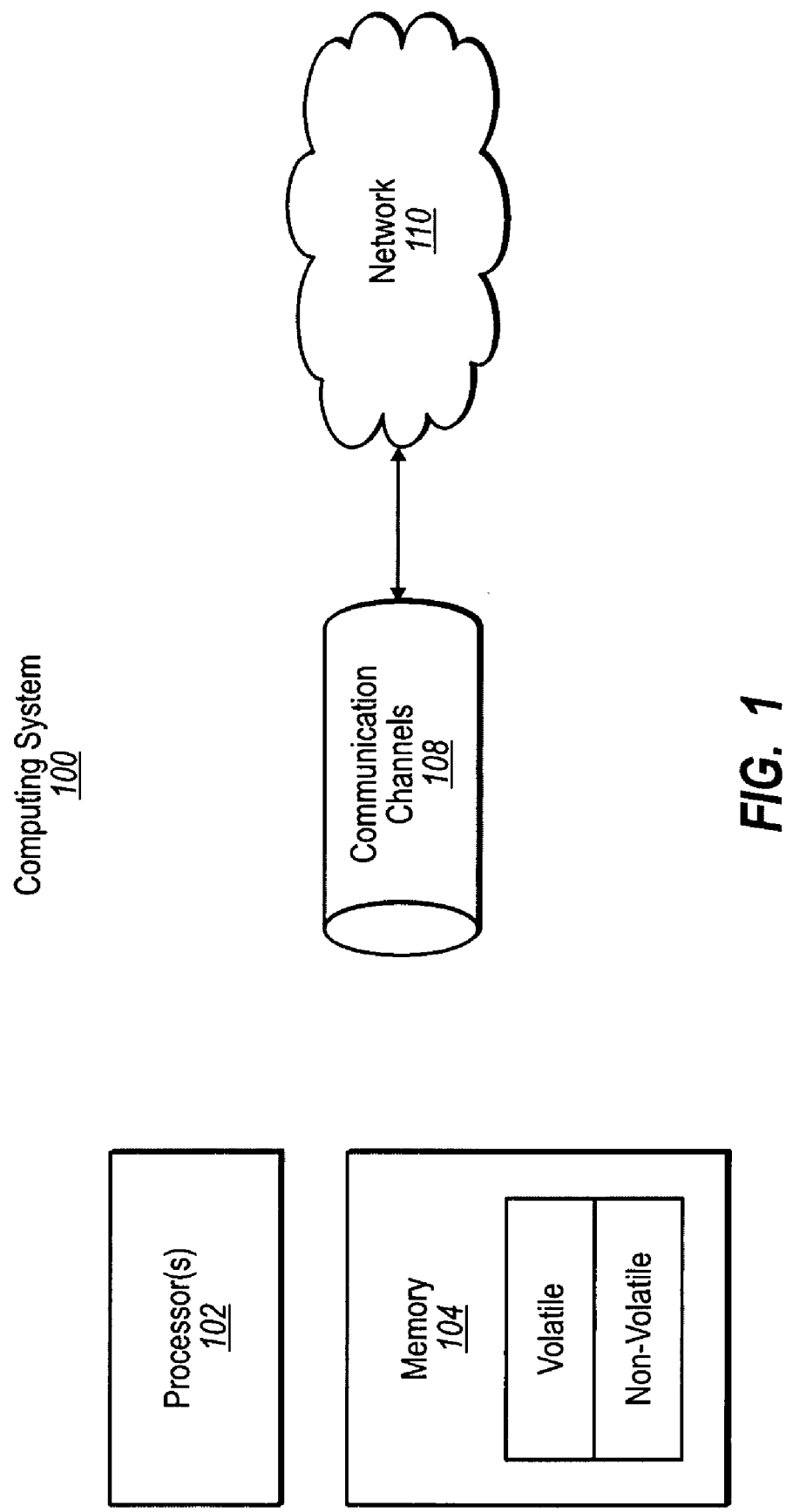
FIG. 1 illustrates an example computing system that may be used to employ embodiments described herein.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
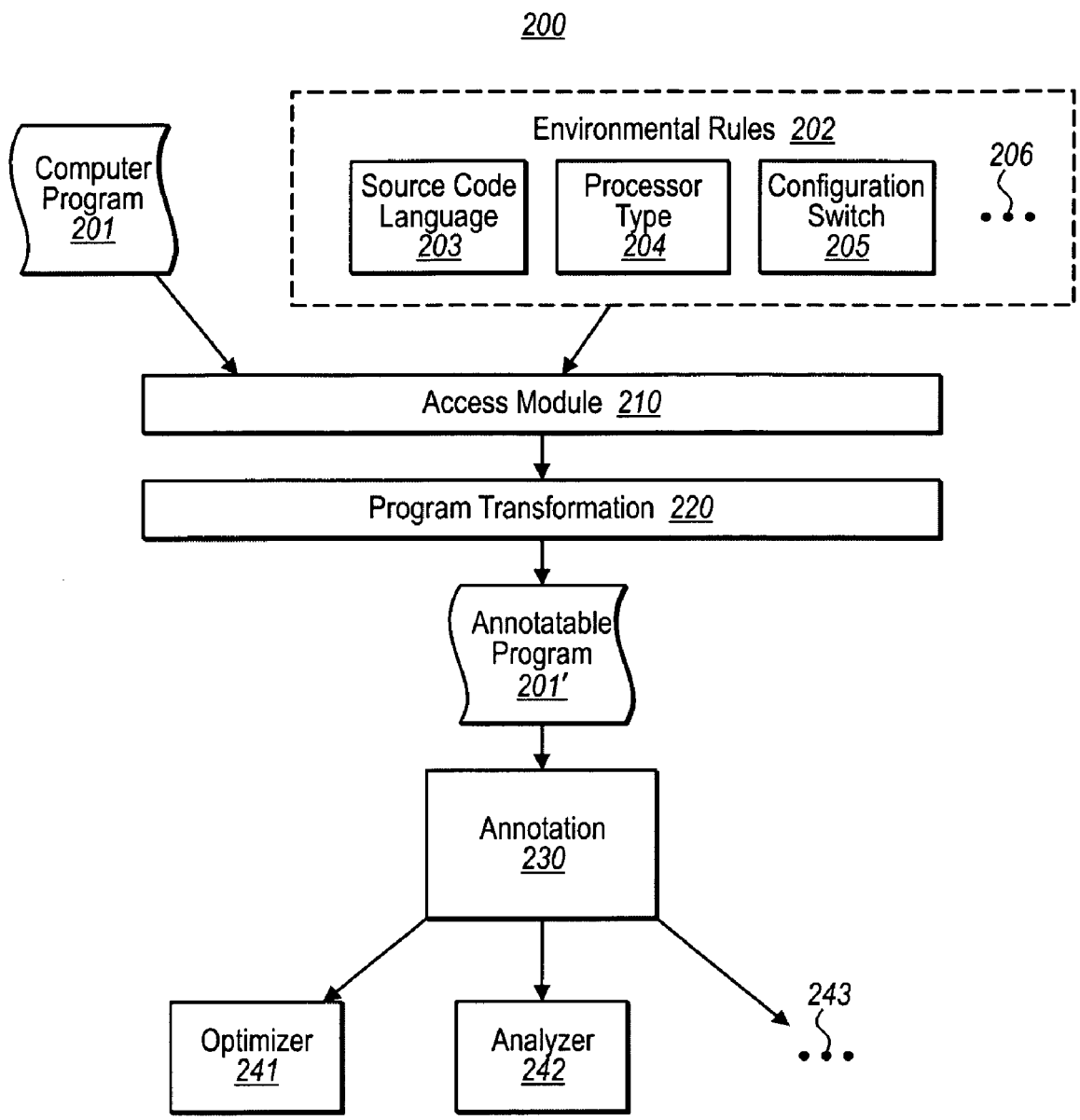
FIG. 2 illustrates an environment in which exception handling information may be annotated into a computer program.

FIG. 2 illustrates an environment 200 that may be used to annotate a computer program with exception handling information. FIG. 3 illustrates a flowchart of a method 300 for annotating exception handling information. Accordingly, the environment 200 of FIG. 2 will first be described with frequent reference to the method 300 of FIG. 3.

In FIG. 2, an access module 210 accesses a computer program 201 and environmental rules 202. In FIG. 3, for example, the method 300 for annotating a computer program with exception handling information first accesses a computer program (act 301), and environmental rules regarding the environment in which the computer program is to be executed (act 302). Back to FIG. 2, if the environment 200 is a compiler, for example, the computer program 201 may be accessed as source code. If the environment 200 is an analyzer that is capable of rebuilding intermediate code from binary, and analyzing that intermediate code, the computer program 201 may be binary. That said, some analyzers may analyze directly the binary code of the computer program 201 itself The computer program 201 may also be represented by intermediate code that is somewhere between source code and binary. The access module 210 may be any component capable of accessing a computer program 201 and environmental rules 202. The access module 210 may be a single component or multiple components or may be integrated within yet other components. The environmental rules 202 include information regarding the environment in which the computer program 201 is to be executed.

For example, the environmental rules 202 may include an identification of the source code rules 203 in which the computer program 201 was originally authored. For instance, if the computer program 201 were in source code, the source code language 203 might be the actual source language that the computer program 201 is represented in. On the other hand, if the computer program 201 were binary, the source code rules might identify that source code that the computer program 201 existed in prior to compilation. The source code rules may also include other information regarding the semantics and syntax of the source code.

The environmental rules 202 might also specify processor rules 204 including a processor type on which the computer program 201 is to run, and associated processing rules for that processor type.

The environmental rules 202 might specify configuration switch rules 205. For instance, if optimization is to be performed on the computer program 201, the configuration switch rules might specify a level of aggressiveness to use when optimizing. That might range from performing no optimization at all, to performing any optimization that can be detected.

The horizontal ellipses 206 represent that there may be other environmental rules specified as well. For instance, the various rules provided by the underlying target runtimes, libraries, and operating systems for the computer program may be specified.

A specific example will now be presented, and will be used throughout the remainder of this description. It would unnecessarily obscure the broader principles of the present invention to present a real computer program as an example of a computer program 201. Accordingly, only a portion of such a computer program will now be presented. The following illustrates source code that might be presented within the computer program 201 if the computer program were represented using C++ source code. Line numbering is added for clarity in referring to the example code, but would not appear in the source code. The example is as follows:

```
1. try
2.   {
3.       int y=2;
4.       *p = x/y;
5.   }
6. catch(...)
7.   {
8.       puts("Caught");
9.   }
```

This example is a try/catch block in C++ code in which the code in the try block is first attempted to be executed. This example will be referred to as the "try/catch" example hereinafter. In a try/catch block, if (and only if) an exception occurs while executing the code in the try portion (lines 3 and 4), the catch portion (line 8) is to be performed. Thus, the catch code represents the exception handling code for the try code. In this particular try code, the value of 2 is assigned to an integer variable referenced as "y". A value referred to as "x" is then divided by the value "y", and the result is assigned to a dereferenced location referred to as "*p". To further complete the example, the environmental rules 202 would include the C++ source code language and its rules, the X64 processor type and its rules, the Win64 API and its rules, and certain configuration switches. In this example, compilation will be performed.

Referring to FIG. 2, a transformation module 220 may transform the accessed component program into annotatable form 201'. The transformation module 220 is not strictly necessary if the computer program 201 is already in annotatable form. In the try/catch example, however, we shall assume for purposes of the example only that some transformation into an intermediate language is to be performed before and/or concurrent with annotation. In the example, the try/catch source code might be converted into the following intermediate form with line numbering added for clarity only.

1. y=Assign 2
2. [p]=Divide x, y, $CatchHandlerLabel

Line 1 represents that the value 2 is to be assigned to the variable y. Line 2 refers to a de-referenced location [p], which replaces *p in the source code. Divide x, y means that the value represented by "x" is to be divided by the value represented by "y". The expression "[p]=Divide x, y" means that the result of the division of "x" by "y" is to be stored at the de-referenced location [p]. This expression replaces the source code expression "*p=x/y". The full instruction "[p]=Divide x, y, $CatchHandlerLabel" means that not only is the result of the division of "x" and "y" to be assigned to the de-referenced location [p], but also that if an exception occurs during this operation, the exception code referenced by $CatchHandlerLabel is to be executed. The $CatchHandler-Label code refers to the exception code of the catch block in the source code. Similar intermediate code might be reconstructed from binary should the intermediate code be used by an analyzer.

Referring to FIG. 2, the environment 200 includes an annotation module 230 which receives the annotatable computer program 201'. Referring to FIG. 2, the annotation module 230 may detect one or more portions of the computer program 201' that, in the context of the environmental rules 202, may cause exceptions to be thrown by the computer program (act 303). The following illustrates the intermediate code of the try/catch example in which the percentage symbol "%" is placed immediately following the instruction portion that might cause an exception.

1. y=Assign 2
2. [p]%=Divide% x, y, $ CatchHandlerLabel

The initial detection of portions that might cause exception might be quite conservative. In line 1, the instruction "y=Assign 2" is not viewed as potentially causing an exception. The instruction in line 2, however, include two portions that might cause an exception, one of those portions being the operand "[p]", and the other being the operator "Divide". The dereferenced location "[p]" might cause an exception because it is not initially known to the annotation module 230 whether or not the program has rights to access the underlying location. The specific type of exception would be an access violation exception. The operator "Divide" might cause an exception since it is not initially known whether or not the divisor is zero. If the divisor was zero, then a divide by zero exception might be thrown.

Referring to FIG. 3, the annotation module annotates at least one, some or all of the detected portions with exception information describing one or more exceptions that could be thrown at that detected portion (act 304). For example, in the intermediate code of the try/catch example, the following annotation or its equivalent may be associated with the operand "[p]" in the instruction of line 2: "Exception Type=>Access Violation". The following annotation or its equivalent may be associated with the operator "Divide" in the instruction of line 2: "Exception Type=>Divide by Zero".

In addition to specifying the exception type, further information may be specified in the annotation. For instance, constraints might be specified. As an example, the annotation might specify whether this exception may be suppressed. In some languages, a divide by zero exception might be suppressed if, for example, the divisor is a floating point value. Another possible constraint might be that a certain ordering of exceptions should be preserved. In one embodiment, the annotations may be comprehensive including enough information for an optimizer or analyzer that there is no needed to query outside of the computer program 201 for information regarding the operation of the computer program 201.

Referring back to FIG. 2, once the computer program 201' is annotated by the annotation module 230, any number of things might be done to the computer program 201' taking advantage of the annotations. As one example, a compiler might use an optimization module 241 to further optimize the computer program during compilation. In an analyzer environment, an analyzer module 242 might perhaps use the annotations to analyze the program. For example, perhaps a developer wants to know whether any exceptions of a particular type occur anywhere in the computer program. The annotations could be used to determine that. While an optimizer 241 and analyzer 242 typically would not occur in the same environment, they certainly could, and are shown here to demonstrate the wide variety of applications that could use the annotations. Such variety is represented by the horizontal ellipses 243.

FIG. 4A illustrates a flowchart of a method 400A for optimizing the computer program taking into consideration exception handling annotations. The method 400A may be performed by the optimizer 241 of FIG. 2, and will continue with the previously presented try/catch example.

The optimizer 241 may, for example, optimize the computer program in the area of the detected portion in view of the corresponding annotated exception information for that detected portion (act 401A). As part of that the optimizer might also refine the exception information upon further evaluating the computer program (act 402A). This process may be repeated until optimization is completed.

For example, the optimizer might first divide line 2 of the intermediate code of the try/catch example into two separate instructions to thereby change the control flow as follows:

1. y=Assign 2
2. t100=Divide % x, y, $CatchHandlerLabel
3. [p]%=t100, $CatchHandlerLabel The previous line 2 has now been split into lines 2 and 3, each causing a possible exception leading to exception code $CatchHandlerLabel. Note how the annotations may follow when the operator or operand that it references moves. For instance, the annotation for the operand "[p] stays with that operand, and the annotation for the operator "Divide" stays with that operator.

A further optimization happens when the optimizer 241 recognizes that "y" is not zero, but is assigned the value 2 in line 1. The optimizer might then replace instances of y in the next instruction at line 2 resulting in the following intermediate code:

1. t100=Divide % x, 2, $CatchHandlerLabel
2. [p]%=t100, $CatchHandlerLabel

Here, line 1 has been eliminated, and the value 2 has been used for the variable "y". Now, the optimizer might review the annotation information for the "Divide" operator. The annotation specifies that the only exception in line 1 was the Divide by Zero exception. However, the optimizer now knows that the divisor is two, which is clearly non-zero. Accordingly, a divide by zero exception cannot occur. Unless constrained by other information in the annotation (like a "do not suppress" constraint for divide by zero exceptions), the optimizer may suppress the divide by zero exception. Furthermore, since the divide by zero exception was the only exception mentioned in the optimizer, the annotation associated with the "Divide" operator may be removed. The result is the following intermediate code:

1. t100=Divide x, 2
2. [p]%=t100, $CatchHandlerLabel

Now, since there is no exception associated with line 2, that instruction might be moved in further optimization realizing that a divide by zero exception will not occur when using this "Divide" operator.

FIG. 4B illustrates a method for analyzing the annotations. While the FIG. 4B only includes one act of evaluating the annotations (act 401B), that act is illustrated as continuing from act 304 of FIG. 4. The analyzing might be performed by, for example, the analyzer 242 of FIG. 2.

Thus, a mechanism for annotating code with exception handling information has been described in which the exception handling describes the exception type associated with a portion of code (such as an operator or operand). This permits depth and intelligence in optimization and analyzing of the computer program. Furthermore, if the annotations were comprehensive, compilation and analysis may occur without resorting to external information outside of the computer program itself The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer storage devices having stored thereon computer-executable instructions that, when executed by one or more processors of a computing system, causes the computing system to perform a method for optimizing a computer program while taking into consideration exception handling, the method comprising:

an act of the computing system accessing a computer program during compilation of the computer program from source code to intermediate code;

an act of the computing system detecting an instruction of the computer program that may cause one or more exceptions to be thrown by the computer program when the computer program is executed, including detecting that one or both of an operator or an operand of the instruction may cause an exception to be thrown when the computer program is executed;

an act of the computing system annotating the intermediate code, including annotating one or both of the operator or the operand with corresponding exception information, for each of the operator or the operand the corresponding exception information including:

a corresponding indicator that indicates that the operator or the operand may cause one or more corresponding exceptions to be thrown during execution of the operator or the operand;

a corresponding description that describes one or more types of the one or more corresponding exceptions that the operator or the operand may throw during execution of the operator or the operand; and a catch handler label that refers to exception code that can be executed to handle the one or more corresponding exceptions that the operator or the operand may throw during execution of the operator or the operand; and an act of the computing system optimizing the intermediate code of the computer program based on the annotated exception information in the intermediate code.

2. A computer program product in accordance with claim 1, the method further comprising:

an act of accessing environmental rules regarding the environment in which the computer program is to be executed, wherein the act of detecting an instruction of the computer program that may cause one or more exceptions is performed in the context of the environmental rules.

3. A computer program product in accordance with claim 2, wherein the environmental rules include source code language rules of the computer program.

4. A computer program product in accordance with claim 2, wherein the environmental rules include processor type rules.

5. A computer program product in accordance with claim 2, wherein the environmental rules includes configuration switch rules.

6. A computer program product in accordance with claim 1, wherein the exception information includes one or more optimization constraints on optimizing with respect to the described one or more corresponding exceptions in the exception information.

7. A computer program product in accordance with claim 1, the method further comprising:
   an act of refining the exception information upon further evaluating the computer program, including removing exception information from at least one of the operator or the operand in the intermediate code when it is determined that the one or more corresponding exceptions identified by the exception information cannot occur.

8. A method, implemented at a computer system that includes one or more processors and system memory, for optimizing a computer program while taking into consideration exception handling, the method comprising:
   an act of the computer system accessing a computer program during compilation of the computer program from source code to intermediate code;
   an act of the computer system detecting an operation of the computer program that may cause one or more exceptions to be thrown by the computer program when the computer program is executed, including detecting that one or both of an operator or an operand of the operation may cause an exception to be thrown when the computer program is executed;
   an act of the computer system annotating the intermediate code, including annotating one or both of the operator or the operand with corresponding exception information, for each of the operator or the operand the corresponding exception information including:
      a corresponding indicator that indicates that the operator or the operand may cause one or more corresponding exceptions to be thrown during execution of the operator or the operand;
      a corresponding description that describes one or more types of the one or more corresponding exceptions that the operator or the operand may throw during execution of the operator or the operand; and
   a catch handler label that refers to exception code that can be executed to handle the one or more corresponding exceptions that the operator or the operand may throw during execution of the operator or the operand; and
   an act of the computer system optimizing the intermediate code of the computer program based on the annotated exception information in the intermediate code.

9. A method in accordance with claim 8, the method further comprising:
   an act of accessing environmental rules regarding the environment in which the computer program is to be executed, wherein the act of detecting an operation of the computer program that may cause one or more exceptions is performed in the context of the environmental rules.

10. A method in accordance with claim 9, wherein the environmental rules include source code language rules of the computer program.

11. A method in accordance with claim 9, wherein the environmental rules include processor type rules.

12. A method in accordance with claim 9, wherein the environmental rules includes configuration switch rules.

13. A method in accordance with claim 8, wherein the exception information includes one or more optimization constraints on optimizing with respect to the described one or more corresponding exceptions in the exception information.

14. A method in accordance with claim 8, the method further comprising:
   an act of refining the exception information upon further evaluating the computer program including removing exception information from at least one of the operator or the operand in the intermediate code when it is determined that the one or more corresponding exceptions identified by the exception information cannot occur.

15. A computer system, comprising:
   one or more processors; and
   a computer-readable storage media storing computer-executable instructions that, when executed by the one or more processors, cause the computer system to implement a method for optimizing a computer program while taking into consideration exception handling, including the flowing:
      accessing a computer program during compilation of the computer program from source code to intermediate code;
      detecting an instruction of the computer program that may cause one or more exceptions to be thrown by the computer program when the computer program is executed, including detecting that one or both of an operator or an operand of the instruction may cause an exception to be thrown when the computer program is executed;
      annotating the intermediate code, including annotating one or both of the operator or the operand with corresponding exception information, for each of the operator or the operand the corresponding exception information including:
         a corresponding indicator that indicates that the operator or the operand may cause one or more corresponding exceptions to be thrown during execution of the operator or the operand;
         a corresponding description that describes one or more types of the one or more corresponding exceptions that the operator or the operand may throw during execution of the operator or the operand; and
         a catch handler label that refers to exception code that can be executed to handle the one or more corresponding exceptions that the operator or the operand may throw during execution of the operator or the operand; and
      optimizing the intermediate code of the computer program based on the annotated exception information in the intermediate code.

* * * * *